(12) United States Patent
Venkataraghavan

(10) Patent No.: US 12,537,758 B2
(45) Date of Patent: Jan. 27, 2026

(54) SYSTEM AND METHODS FOR DYNAMIC BREAKOUT-PATH DETERMINATION IN TELECOMMUNICATIONS NETWORKS

(71) Applicant: RAKUTEN MOBILE, INC., Tokyo (JP)

(72) Inventor: Krishnan Venkataraghavan, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 397 days.

(21) Appl. No.: 18/018,318

(22) PCT Filed: Dec. 28, 2022

(86) PCT No.: PCT/US2022/054120
§ 371 (c)(1),
(2) Date: Jan. 27, 2023

(87) PCT Pub. No.: WO2024/144768
PCT Pub. Date: Jul. 4, 2024

(65) Prior Publication Data
US 2025/0097141 A1    Mar. 20, 2025

(51) Int. Cl.
*H04L 45/00*    (2022.01)
*G06N 20/00*    (2019.01)
(Continued)

(52) U.S. Cl.
CPC .............. *H04L 45/22* (2013.01); *G06N 20/00* (2019.01); *H04L 45/3065* (2013.01);
(Continued)

(58) Field of Classification Search
CPC . H04L 45/22; H04L 45/3065; H04L 65/1016; H04L 65/1086; H04L 65/80; H04W 40/12
See application file for complete search history.

(56) References Cited

U.S. PATENT DOCUMENTS

2007/0171895 A1\* 7/2007 Oberle .............. H04W 36/0033
370/352
2009/0129374 A1\* 5/2009 Yurchenko .......... H04M 7/1245
370/352

(Continued)

OTHER PUBLICATIONS

"Modeling of IMS Call Flows: Load Estimation for Core Network Components"; Falchuk et al.; Journal of Mobile Multimedia, vol. 2, No. 3 (2006) 259-282 (Year: 2006).\*

(Continued)

*Primary Examiner* — Benjamin H Elliott, IV
(74) *Attorney, Agent, or Firm* — Sughrue Mion, PLLC

(57) ABSTRACT

Systems and methods for optimizing break-out/break-in paths of voice calls between a source operator's (SO) IP Multimedia Core Network Subsystems (IMS) and a target operator's IMS (TO IMS), the method includes: obtaining a voice call originating from a user equipment (UE) in the SO IMS and terminating at an UE in the TO IMS; determining a routing policy for the voice call; determining an optimal TO Interconnect Session Border Controller (ISBC) by applying at least one path metric according to the routing policy to a machine learning (ML) model for determining an optimal route between the SO IMS and the TO IMS; and route the voice call to the optimal TO ISBC, wherein, the ML model, for determining the optimal TO ISBC using, for each of the path metrics, one or more routing parameter rankings of a plurality of possible paths between the SO IMS and the TO IMS.

18 Claims, 10 Drawing Sheets

(51) Int. Cl.
*H04L 45/302* (2022.01)
*H04L 65/1016* (2022.01)
*H04L 65/1083* (2022.01)
*H04L 65/80* (2022.01)
*H04W 40/12* (2009.01)

(52) U.S. Cl.
CPC ...... *H04L 65/1016* (2013.01); *H04L 65/1086* (2013.01); *H04L 65/80* (2013.01); *H04W 40/12* (2013.01)

(56) References Cited

U.S. PATENT DOCUMENTS

| | | | |
|---|---|---|---|
| 2010/0131621 A1* | 5/2010 | Zetterlund | H04L 65/1043 709/221 |
| 2012/0250622 A1* | 10/2012 | Gomez Diaz | H04L 65/1043 370/328 |
| 2019/0104458 A1* | 4/2019 | Svennebring | H04L 45/42 |
| 2020/0245235 A1* | 7/2020 | Chun | H04W 48/18 |
| 2022/0116265 A1* | 4/2022 | Boyle, III | H04L 43/20 |
| 2022/0182393 A1* | 6/2022 | Powers | H04L 47/70 |
| 2024/0235951 A9* | 7/2024 | Lukens | H04L 41/5032 |
| 2024/0291709 A1* | 8/2024 | Boyle, III | H04L 43/0823 |
| 2025/0097141 A1* | 3/2025 | Venkataraghavan | H04L 65/80 |

OTHER PUBLICATIONS

International Search Report dated May 2, 2023 in Application No. PCT/US22/54120.
Written Opinion of the International Searching Authority dated May 2, 2023 in Application No. PCT/US22/54120.

* cited by examiner

FIG. 4A

| BREAK IN/OUT | BREAKOUT(WITHOUT NNI) | | | | |
|---|---|---|---|---|---|
| | SO/TO | OPERATOR(HOME) | OPERATOR 1 | OPERATOR 2 | OPERATOR...3 |
| | OPERATOR(HOME) | TRFO | TRANSCODING | TRANSCODING | TRANSCODING |
| | OPERATOR 1 | TRANSCODING | TRFO | TRANSCODING | TRANSCODING |
| | OPERATOR 2 | TRANSCODING | TRANSCODING | TRFO | TRANSCODING |
| | OPERATOR 3..N | TRANSCODING | TRANSCODING | TRANSCODING | TRFO |

FIG. 4B

| BREAK IN/OUT | BREAKOUT(WITHOUT NNI) | | | | |
|---|---|---|---|---|---|
| | SO/TO | OPERATOR(HOME) | OPERATOR 1 | OPERATOR 2 | OPERATOR...3 |
| | OPERATOR(HOME) | TRFO | COST 1..N | COST 1..N | COST 1..N |
| | OPERATOR 1 | COST 1..N | TRFO | COST 1..N | COST 1..N |
| | OPERATOR 2 | COST 1..N | COST 1..N | TRFO | COST 1..N |
| | OPERATOR 3..N | COST 1..N | COST 1..N | COST 1..N | TRFO |

FIG. 4C

| BREAK IN/OUT | BREAKOUT(WITHOUT NNI) | | | | |
|---|---|---|---|---|---|
| | SO/TO | OPERATOR(HOME) | OPERATOR 1 | OPERATOR 2 | OPERATOR...3 |
| | OPERATOR(HOME) | TRFO | QUALITY 1..N | QUALITY 1..N | QUALITY 1..N |
| | OPERATOR 1 | QUALITY 1..N | TRFO | QUALITY 1..N | QUALITY 1..N |
| | OPERATOR 2 | QUALITY 1..N | QUALITY 1..N | TRFO | QUALITY 1..N |
| | OPERATOR 3..N | QUALITY 1..N | QUALITY 1..N | QUALITY 1..N | TRFO |

Metrics for Optimal Call Path Determination

| Metric | Route | Quality Rank | Cost Rank |
|---|---|---|---|
| Time of Day | Route 1..n | Qr 1..n | Cr 1..n |
| Avg MOU | Route1..n | Qr 1..n | Cr 1..n |
| Call Setup Success Rate | Route1..n | Qr 1..n | Cr 1..n |
| Call Setup Time | Route1..n | Qr 1..n | Cr 1..n |
| Total Call Cost | Route1..n | Qr 1..n | Cr 1..n |
| Voice MOS | Route1..n | Qr 1..n | Cr 1..n |
| Metric 1..n | Route 1..n | Qr 1..n | Cr 1..n |

FIG. 7

SYSTEM AND METHODS FOR DYNAMIC BREAKOUT-PATH DETERMINATION IN TELECOMMUNICATIONS NETWORKS

This Application is a National Stage of International Application No. PCT/US2022/054120 filed Dec. 28, 2022.

TECHNICAL FIELD

Systems and methods consistent with example embodiments of the present disclosure relate to optimizing network-to-network voice calls by dynamically determining a breakout path in telecommunications networks.

BACKGROUND

In the related art, network-to-network connections between IP Multimedia Core Network Subsystems (IMS) are handled by an Interconnect Session Border Controller (ISBC). The ISBC at a source operator's network side and the ISBC at a target operator's network side allow a voice call from originating user equipment (UE) to break out of the source operator's network (i.e., a source IMS) into the target operator's network (i.e., a target IMS). FIG. 1 illustrates a call break-out/break-in architecture between a source operator (SO) and target operator (TO). Referring to FIG. 1, a Voice over LTE (VoLTE) call (i.e., a voice call over a $4^{th}$ generation mobile network), for example, is initiated by the originating UE in the SO IMS, whereas a break-out call is defined to be a call that is routed via the SO ISBC (i.e., a SO breakout gateway), a Session Initiation Protocol (SIP) interface or a Non-SIP interface (e.g., a time division multiplex (TDM) interface) and a respective TO ISBC (e.g., one or more TO breakout gateways of different target operators TO1 to TOn) to the TO IMS.

Conversely, a break-in call may be handled vice versa. As a result, based on the SO ISBC and the TO ISBC, different conditions may apply to calls breaking in/out between the source operator's network (e.g., the SIP/Non-SIP interface of the target operators' network) and a target operator's network.

To this end, while the source operator has a good handle on calls within the SO IMS, call quality (i.e., voice quality) and cost of calls (e.g., roaming remuneration) for break-out calls (i.e., between the SO IMS and the TO IMS) is largely determined by the actual route of the break-out call (i.e., the break-out path) between the SO IMS and the TO IMS.

In the related art, calls breaking in/out between the SO IMS and the TO IMS are handled based on static route configurations. That is, for a given SO IMS and TO IMS, the route is predetermined and fixed.

As a result, in accordance with the related art, the static route configurations can lead to inferior call quality (i.e., voice quality) and to cost inefficiency (i.e., roaming remuneration) that may negatively impact user experience and SOs alike.

SUMMARY

According to embodiments, systems and methods are provided for optimizing break-out/break-in paths of calls between a source operator's network (SO IMS) and a target operator's network (TO IMS) by dynamically determining an optimal breakout path (e.g., determining an optimal TO ISBC) for a voice call based on variable path metrics and dynamically updating the path metrics based on call quality/cost feedback for the voice call.

As a result, the systems and methods enable the SO to apply the optimal breakout path for routing a voice call to the TO IMS, thereby enhancing user experience in the SO IMC (i.e., optimizing call quality) and optimizing costs for network-to-network calls.

According to embodiments, a system for optimizing break-out/break-in paths of voice calls between a source operator's (SO) IP Multimedia Core Network Subsystems (IMS) and a target operator's IMS (TO IMS) includes: at least one memory storing instructions; and at least one processor configured to execute the instructions to: obtain a voice call originating from a user equipment (UE) in the SO IMS and terminating at an UE in the TO IMS; determine a routing policy for the voice call; determine an optimal TO Interconnect Session Border Controller (ISBC) by applying at least one path metric according to the routing policy to a machine learning (ML) model for determining an optimal route between the SO IMS and the TO IMS; and route the voice call to the optimal TO ISBC, wherein the ML model determines the optimal TO ISBC by using, for each of the at least one path metric, one or more routing parameter rankings of a plurality of possible paths between the SO IMS and the TO IMS.

The one or more routing parameter rankings may include quality rankings and cost rankings.

The at least one processor may be further configured to execute the instructions to provide, to the ML model, feedback on the voice call routed to the optimal TO ISBC; wherein the ML model is a reinforcement learning model configured to update the one or more routing parameter rankings of the plurality of possible paths between the SO IMS and the TO IMS based on the feedback; and the feedback comprises at least one of cost and quality information of the voice call.

The routing policy may be determined from among a plurality of routing policies, the plurality of routing policies comprising at least one of a cost-centric routing policy, a quality-centric routing policy, and one or more combined cost and quality routing policies.

The at least one path metric may include at least one of, but not limited to, a Time of Day, an Average Minutes of Usage (MOU), a Call Setup Success Rate, a Call Setup Time, a Total Call Cost, and a Voice Mean Opinion Score (MOS).

The ML model may predict the optimal TO ISBC based on a combination of a call cost and/or a call quality for the plurality of possible paths.

According to embodiments, a method for optimizing break-out/break-in paths of voice calls between a source operator's (SO) IP Multimedia Core Network Subsystems (IMS) and a target operator's network (TO IMS) includes: obtaining a voice call originating from a user equipment (UE) in the SO IMS and terminating at an UE in the TO IMS; determining a routing policy for the voice call; determining an optimal TO Interconnect Session Border Controller (ISBC) by applying at least one path metric according to the routing policy to a machine learning (ML) model for determining an optimal route between the SO IMS and the TO IMS; and route the voice call to the optimal TO ISBC, wherein, the ML model, for determining the optimal TO ISBC using, for each of the at least one path metric, one or more routing parameter rankings of a plurality of possible paths between the SO IMS and the TO IMS.

The one or more routing parameter rankings may include quality rankings and cost rankings.

The method may further include: providing, to the ML model, feedback on the voice call routed to the optimal TO ISBC; wherein the ML model is a reinforcement learning model configured to update the one or more routing parameter rankings of the plurality of possible paths between the SO IMS and the TO IMS based on the feedback; and the feedback comprises at least one of cost and quality information of the voice call.

The routing policy may be determined from among a plurality of routing policies, the plurality of routing policies comprising at least one of a cost-centric routing policy, a quality-centric routing policy, and one or more combined cost and quality routing policies.

The at least one path metric may include at least one of, but not limited to, a Time of Day, an Average Minutes of Usage (MOU), a Call Setup Success Rate, a Call Setup Time, a Total Call Cost, and a Voice Mean Opinion Score (MOS).

The ML model may predicts the optimal TO ISBC based on a combination of a call cost and/or a call quality for the plurality of possible paths.

According to embodiments, a non-transitory computer-readable recording medium having recorded thereon instructions executable by at least one processor configured to perform a method for optimizing break-out/break-in paths of voice calls between a source operator's (SO) IP Multimedia Core Network Subsystems (IMS) and a target operator's network (TO IMS) includes: obtaining a voice call originating from a user equipment (UE) in the SO IMS and terminating at an UE in the TO IMS; determining a routing policy for the voice call; determining an optimal TO Interconnect Session Border Controller (ISBC) by applying at least one path metric according to the routing policy to a machine learning (ML) model for determining an optimal route between the SO IMS and the TO IMS; and route the voice call to the optimal TO ISBC, wherein, the ML model, for determining the optimal TO ISBC using, for each of the at least one path metric, one or more routing parameter rankings of a plurality of possible paths between the SO IMS and the TO IMS.

The one or more routing parameter rankings may include quality rankings and cost rankings.

The method may further include: providing, to the ML model, feedback on the voice call routed to the optimal TO ISBC; wherein the ML model is a reinforcement learning model configured to update the one or more routing parameter rankings of the plurality of possible paths between the SO IMS and the TO IMS based on the feedback; and the feedback comprises at least one of cost and quality information of the voice call.

The routing policy may be determined from among a plurality of routing policies, the plurality of routing policies comprising at least one of a cost-centric routing policy, a quality-centric routing policy, and one or more combined cost and quality routing policies.

The at least one path metric may include at least one of, but not limited to, a Time of Day, an Average Minutes of Usage (MOU), a Call Setup Success Rate, a Call Setup Time, a Total Call Cost, and a Voice Mean Opinion Score (MOS).

The ML model may predicts the optimal TO ISBC based on a combination of a call cost and/or a call quality for the plurality of possible paths.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which Like reference numerals denote like elements, and wherein:

FIGS. 4A to 4C illustrate routing parameters between the SO and one or more TOs depending on the break-out/break-in path according to an embodiment;

FIG. 7 illustrates path metrics input to the ML model according to an example embodiment;

DETAILED DESCRIPTION

The following detailed description of example embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Figure 2:
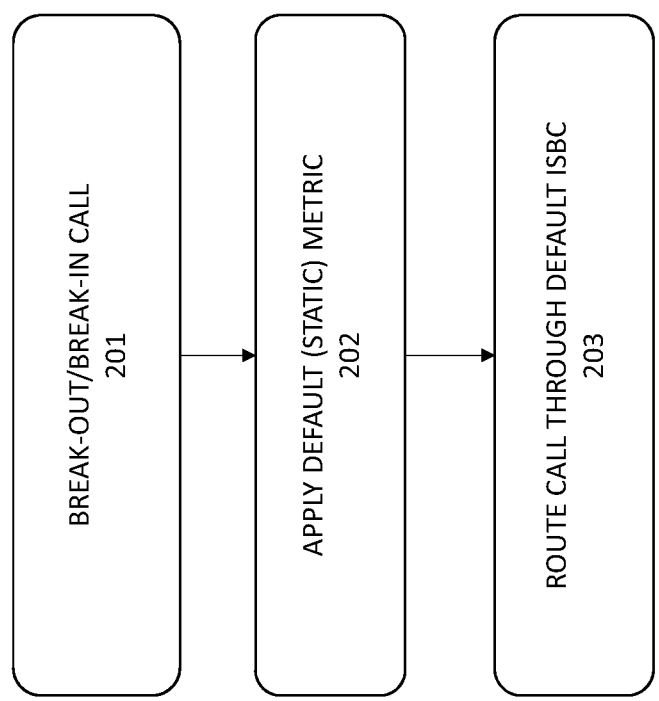
FIG. 2 shows a method to handle static route configurations of break out/in calls based on predetermined metrics according to the related art.

FIG. 2 shows a method to handle static route configurations of break-out/break-in calls based on predetermined metrics according to the related art. Referring to FIG. 2, in step 201, an originating UE in a SO IMS initiates a voice call to a terminating UE in a TO IMS (i.e., initiates a break-out/break-in call). For example, the break-out/break-in call may a VoLTE call or a voice call from an over-the-top (OTT) application hosted by the originating UE.

In step 202, based on whether the break-out/break-in call is a VoLTE call or OTT application voice call, the SO determines a static break-out/break-in path for the break-out/break-in call (i.e., the SO uses a static routing table for a predetermined SO ISBC and the TO IMS of the terminating UE).

In step 203, the SO (e.g., SO ISBC) routes the break-out/break-in call over the static break-out/break-in path (i.e., to a TO ISBC).

Referring to FIG. 2, the route to the TO ISBC (i.e., the static route configuration based on predetermined metrics) can lead to inferior call quality (i.e., voice quality) and/or to cost inefficiency of calls (i.e., roaming remuneration) that may negatively impact user experience and may be cost-inefficient for both the SO and the SO IMS user.

Figure 3:
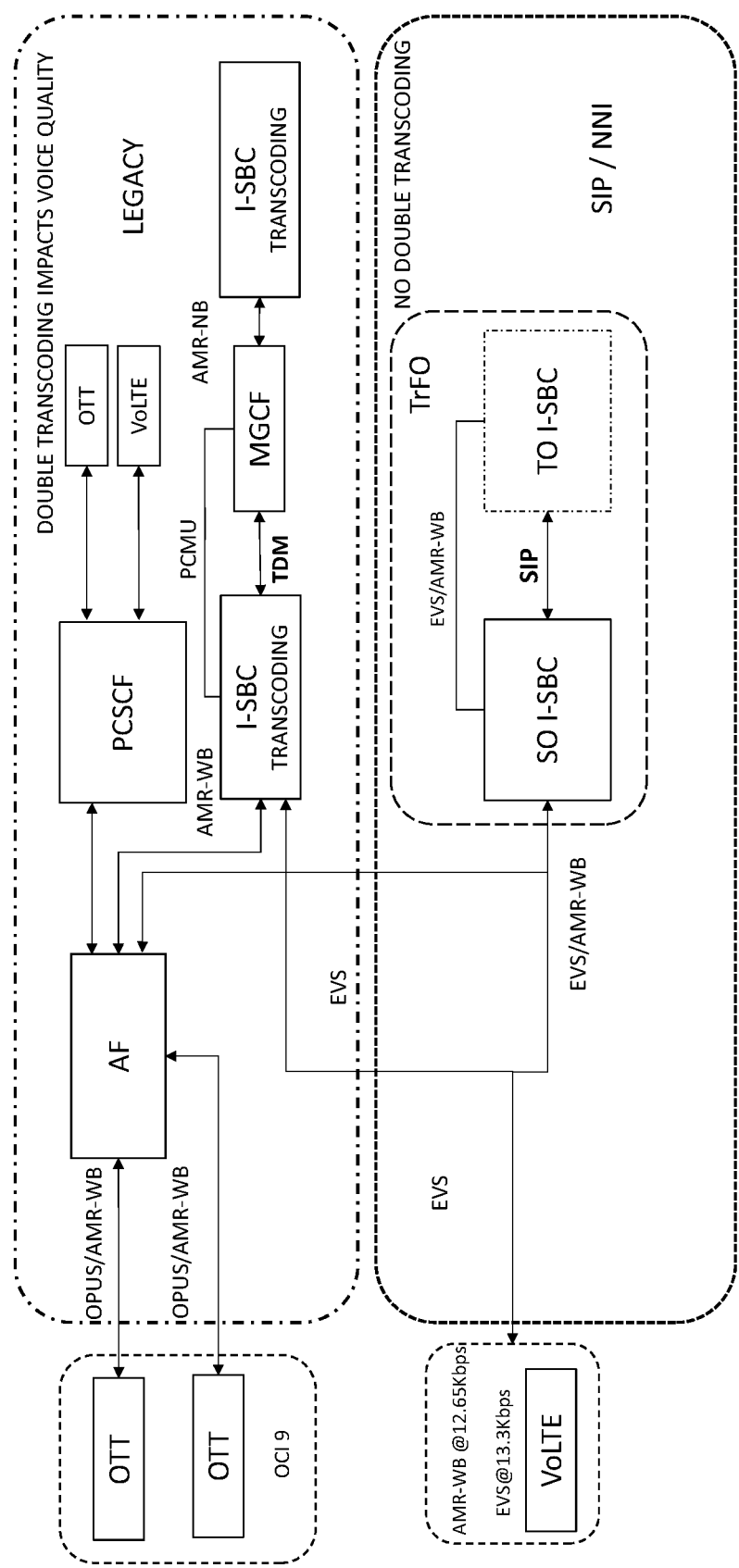
FIG. 3 illustrates call flows between a SO IMS and a TO IMS according to the related art.

FIG. 3 illustrates call flows between a SO IMS and a TO IMS according to the related art. Referring to FIG. 3, voice calls in a SO IMS are initiated by a VoLTE call of an originating UE or initiated from an OTT application (i.e., an OTT voice call application) hosted by an originating UE.

The OTT application may be any application installed on a user equipment (UE) that uses an internet connection provided by the SO/TO IMS to offer a service that is provided by a third party other than the SO or the TO. For example, the OTT application may be a voice call service (e.g., VoIP) that allows for break-in/break-out calls routed between the SO IMS and the one or more TO IMSs from the originating UE to the terminating UE.

In case of a VoLTE call from an originating UE in the SO IMS, a standard audio codec such as an Enhanced Voice Services (EVS) audio codec (i.e., an audio compression format optimized for speech) is used. The EVS is described in 3GPP TS 26.441, and TS 26.442.

To this end, the voice of a caller in a VoLTE call is encoded by the EVS codec, for example, at a bit rate of 13.3 kbps and, for example, routed over an SO LTE network (i.e., the SO IMS).

The EVS-encoded VoLTE call is routed via a SIP interface (i.e., a Network-to-Network Interface (NNI)) from the SO ISBC to the TO ISBC, and from the TO ISBC to the terminating UE in the respective TO IMS. The routing may be predetermined based on a routing table at the SO and is based on the predetermined metrics of the TO IMS (e.g., the TO ISBC) as set forth in FIG. 2.

In case the TO provides a TO ISBC that enables the NNI comprising a SIP interface, a Transcoding Free Operation (TrFO) between the SO IMS and the TO IMS may be deployed to the beak-out call (i.e., the VoLTE call to the terminating UE in the TO IMS).

For example, in case of an EVS-encoded VoLTE call, the EVS may provide backward compatibility to other voice/audio codec standards, such as, for example, an Adaptive Multi-Rate (AMR) (e.g., an AMR-WB wideband mode and/or an AMR-NB narrowband mode, etc.).

In case the TO ISBC provides for a SIP interface, the EVS encoded VoLTE call may also be routed via the SIP interface even if the call uses an audio codec other than EVS, such as an AMR-WB wideband mode. To this end, the Transcoding Free Operation (TrFO) between the SO IMS and the TO IMS may also be provided for break-in/break-out calls encoded by an AMR-WB wideband mode audio codec.

Moreover, in case the TO ISBC does not provide a SIP interface (i.e., the TO ISBC only provides a non-SIP interface (e.g., a Bearer Independent Call Control (BICC), an ISDN User Part (ISUP) or a SIP with encapsulated ISUP (SIP-I), etc.), transcoding between the SO ISBC and the one or more TO ISBCs may be necessary. In this case, the SO may route the VoLTE call to an SO ISBC comprising a transcoder that is compatible with the network interface of the TO ISBC. For example, the SO ISBC provides a connection via a Time-division multiplexing (TDM) interface (e.g., for example for a hybrid TDM-IP Network connection).

In this case, based on the routing table of the SO, an EVS encoded VoLTE call is routed differently between the SO IMS and the TO IMS.

To this end, the EVS encoded VoLTE call is transcoded at the SO ISBC before breaking out to the TO IMS (e.g., the EVS codec is downgraded to another audio codec which can be routed via the SO ISBC towards the TO ISBC).

For example, in case of a TDM-facing codec policy, a predetermined metric regarding the voice quality between an SO and TO may be set to allow audio codecs such as, for example, Pulse Code Modulation (PCM) of voice frequencies (e.g., PCMU (p-Law) or PCMA (A-Law)).

In this case, the SO ISBC downgrades the EVS or AMR-WB coded call to a PCMU coded call. The SO ISBC communicates the PCMU encoded VoLTE call to a Media Gateway Control Function (MGCF) (e.g., IMS Media Gateway; Mn interface) that controls the interworking of the SO ISBC and the TO ISBC based on the BICC, ISUP or SIP-I interface as set forth above.

The SO's MGCF may include further transcoding, for example, transcoding from the PCMU codec to the AMR-NB narrow band mode (e.g., a network interface between a SO IMS and TO IMS may comprise one or more transcoding steps between to the SO ISBC and the TO ISBC). The transcoding at the SO's MGCF may depends on TO ISBC's setting may include, for example, the transcoding to an AMR-NB codec or any other audio codec supported by the TO ISBC.

Still referring to the FIG. 3, in case an OTT application initiates a voice call from an originating UE, the SO IMS can encode the OTT voice call either by an OPUS audio codec (i.e., OPUS refers to Internet Engineering Task Force (IETF) standard RFC 6716) or by the AMR-WB wideband mode audio codec.

The OTT application may use, for example, a quality class identifier (QCI) 9. The QCI is a scalar that is used within the SO IMS as a reference to network node specific parameters that control packet forwarding treatment (e.g., according to 3GPP TS 23.203, 9 QCI values in Rel-8, 13 QCI values in Rel-12, 15 QCI values in Rel-14.). For example, the OCI may be used to determine the routing of an OTT initiated voice call.

Moreover, the OTT initiated voice call of the originating UE may terminate at an OTT application hosted by a terminating UE in the TO IMS or terminates as a VoLTE at the terminating UE in the TO IMS, depending on the terminating UE and the TO IMS routing policies.

In case of an OTT-initiated voice call (OTT call), the OTT application communicates the call to an Application Function (AF) within the SO IMS. The AF, based on whether it is a break-out/break-in call or not, routes the OTT call to either a Proxy Call Session Control Function (P-CSCF) or to the SO ISBC.

For example, in case the OTT call terminates at the UE in the SO IMS (i.e., a break-in call), the AF communicates to the P-CSCF, wherein the P-CSCF is a SIP proxy that is the first point of contact for any UE in the SO's mobile network (i.e., the SO IMS). In case the break-in call was communicated via a SIP interface to and from the originating/terminating UEs through the P-CSCF, no transcoding may be necessary.

In case the OTT application initiates a voice call from the originating UE in the SO IMS that breaks out of the SO IMS to a targeting UE in a TO IMS, the OTT application communicates the break-in/break-out call to the AF. In this case, the AF, based on the static routing tables and the predetermined metrics of the SO, routes the OTT call to either a SO ISBC that supports a SIP interface or routes the OTT call to a SO ISBC that supports an MGCF interworking between the SO IMS and the TO IMS based on BICC, ISUP or SIP-I, etc.

As set forth above, an OTT call that is routed via the SO ISBC that supports a SIP interface to the TO ISBC can be a interworked as a TrFO break-in/break-out call between the SO IMS and the TO IMS. To this end, the voice call may only need to be transcoded by one audio codec, whereas no double transcoding is necessary.

Meanwhile, in case the OTT call is routed to a SO ISBC that supports MGCF interworking of the SO IMS and the TO IMS (e.g., a TDM interworking comprising one or more transcoding steps), the OTT call may be at least double transcoded as set forth above.

For both, break-out/break-in calls via VoLTE and OTT applications, respectively, the call quality of at least double transcoded calls via an MGCF may be inferior in quality and user experience (i.e., no transcoding interworking between the SO ISBC and the TO ISBC has a superior voice quality over said double transcoding of calls).

FIGS. 4A to 4C illustrate routing parameters between the SO and one or more TOs depending on the break-out/break-in path according to an embodiment. Referring to FIG. 4A, transcoding is a routing parameter that may vary based on path. In an example embodiment, the SO may route a break-out/break-in call in between its own SO networks (i.e., Home Networks). In this case, the SO may use a SIP interface by default. The SIP interface enables a Transfer free operation (TrFO) (i.e., no transcoding is necessary) between the SO's networks.

Further, the SO may route a break-out/break-in call in between the SO IMS and the TO IMS (e.g., a target Operator 1, Operator 2, Operator 3, etc.) based on routing policies. In this case, as set forth in FIG. 3, a transcoding may be necessary in case the TO does not support a SIP interface between the SO ISBC and the respective TO ISBC.

Different TOs (e.g., a target Operator 1, Operator 2, Operator 3, etc.) may have different transcoding conditions. The transcoding conditions (i.e., if and how many transcoding steps are necessary to connect a break-out/break-in voice call) depend on the SO ISBC and the TO ISBC capabilities as set forth in FIG. 3.

Further, an SO may route a break-out/break-in call via an SO ISBC that supports a SIP interface to a TO ISBC that supports a SIP interface (i.e., a breakout with NNI). In this case, a Transfer Free Operation (TrFO) may be established, wherein no double transcoding is necessary.

Referring to FIG. 4B, cost is a routing parameter that may vary based on path. in an example embodiment, the SO may route a break-out/break-in call in between its own SO networks (i.e., Home Networks). In this case, the SO may apply a Transfer free operation (TrFO) (i.e., no or discounted costs apply for the network-to-network call) between the SO's networks.

Further, the SO may route a break-out/break-in call between the SO IMS and one or more TO IMS (e.g., a target Operator 1, Operator 2, Operator 3, etc.) based on routing policies. In this case, TO 1 may charge call costs (i.e., roaming fees) for establishing the network-to-network call between the originating UE in the SO IMS and the terminating UE in its respective TO IMS.

Different TOs (e.g., a target Operator 1, Operator 2, Operator 3, etc.) may charge different call costs (i.e., roaming fees) which results in different call costs for the SO depending on the predetermined network-to-network call costs between the SO and the respective TO. For example, between Operator 1 (SO) and Operator 2 (TO). Moreover, for a particular TO, call costs may vary based on a routing path (e.g., number of hops), a time of day, minutes of use, etc.

Referring to FIG. 4C, quality is a routing parameter that may vary based on path. In an example embodiment, the SO may route a break-out/break-in call between its own SO networks. In this case, the SO may apply a Transfer free operation (TrFO) (i.e., a SO-controlled quality routing policy applies for the network-to-network call) between the SO's networks (i.e., Home Networks).

Further, the SO may route a break-out/break-in call in between the SO IMS and one or more TO IMS (e.g., a target Operator 1, Operator 2, Operator 3, etc.) based on routing policies. In this case, TO 1 may provide for another call quality (i.e., transcoding capabilities or quality centric path metrics) for establishing the network-to-network call between the originating UE in the SO IMS and the terminating UE in its respective TO IMS.

Different TOs (e.g., a target Operator 1, Operator 2, Operator 3, etc.) may provide for different call qualities for network-to-network calls which results in different call qualities for the SO. For example, between Operator 1 (SO) and Operator 2 (TO), a call quality ranking comprising a quality level 1 to N may apply to break-out/break-in call between the SO IMS (Operator 1) and the TO IMS (Operator 2). Moreover, for a particular TO, call costs may vary based on a number of hops, a number of transcoding operations, a type(s) of transcoding operation, network conditions, etc.

Figure 5B:
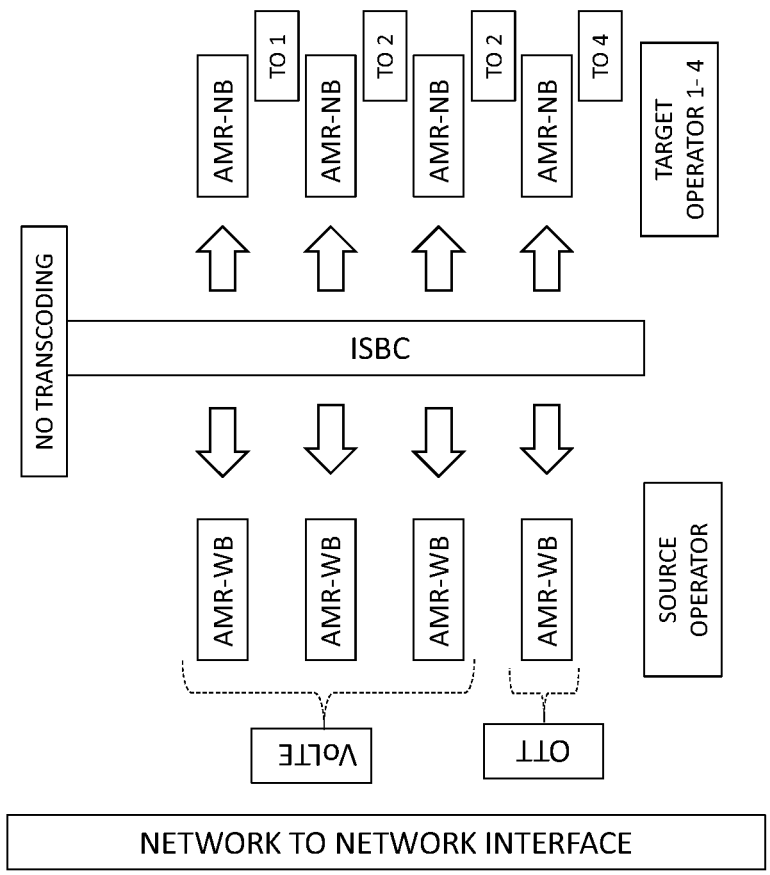
FIGS. 5A and 5B illustrate example embodiments of two network interfaces between a SO IMS and one or more TO IMS with transcoding and without transcoding.
Figure 5A:
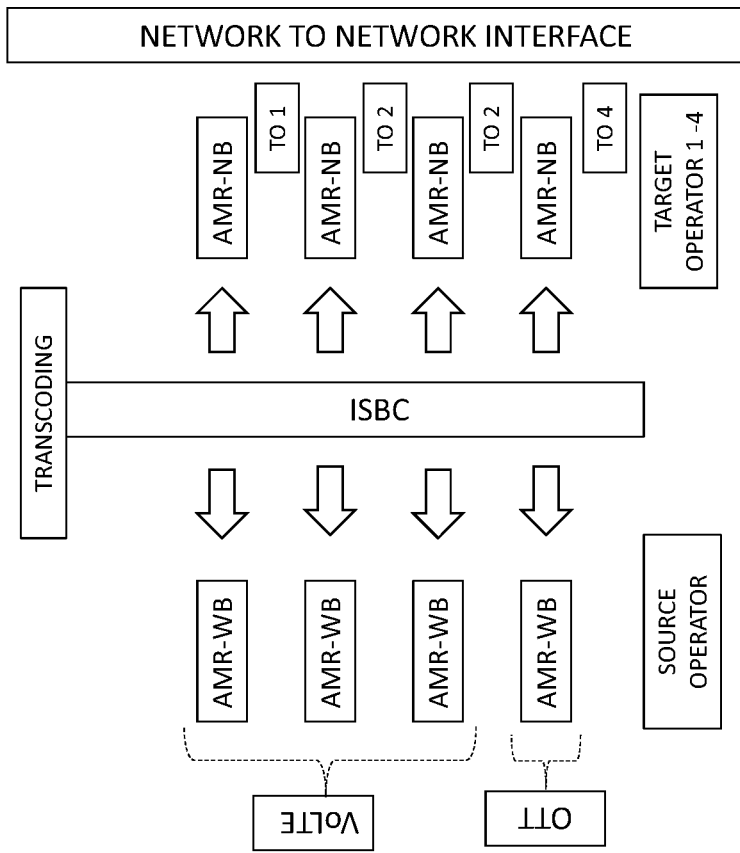

FIGS. 5A and 5B illustrate example embodiments of two network interfaces between a SO IMS and one or more TO IMS with transcoding and without transcoding. Referring to FIG. 5A, the ISBC interworking between an SO IMS and one or more TO IMS makes it necessary to transcode voice calls breaking out of the SO IMS (e.g., at least a double transcoding may necessary as set forth in FIG. 3).

For example, the voice calls (e.g., VoLTE or OTT application-initiated voice calls) in the SO IMS are coded with an AMR-WB wideband mode audio codec, wherein one or more TO ISBCs are not capable to process the AMR-WB audio codes, respectively. In this case, the one or more TO ISBCs cannot provide a SIP interface to connect with the SO ISBC.

As a result, the audio codec may need to be downgraded. In an example embodiment, the one or more TO ISBCs (i.e., the ISBCs of the TO1 to TON) only support an AMR-NB narrow-band mode audio codec.

To this end, the SO ISBC adjusts the audio codec to a level compatible with the audio codec of the respective TO ISBC to which the voice call breaks out (e.g., the SO ISBC may downgrade from AMR-WB to AMR-NB to be compatible with the audio codec of the respective TO ISBC).

Referring to FIG. 5B, the ISBC interworking between an SO IMS and one or more TO IMS provides an interface that does not require transcoding of voice calls breaking out of the SO IMS.

For example, the voice calls (e.g., VoLTE or OTT application-initiated voice calls) in the SO IMS are coded with an AMR-WB wideband mode audio codec, wherein the one or more TO ISBCs are capable to process the AMR-WB audio codec of the SO ISBC, respectively. In this case, the respective TO ISBC of the TO1 to TON may provide a SIP interface to connect with the (e.g., the SO ISBC communicates the AMR-WB coded voice call to the TO ISBC via an NNI/SIP without transcoding the voice).

Referring to FIGS. 5A and 5B, the voice quality of the transcoded breakout voice call according to FIG. 5A is lower than the voice quality of a non-transcoded breakout voice call according to FIG. 5B. Thus, if voice quality is the specified routing policy for the breakout call, the routing parameter to be applied for the break-out/break-in voice call can provide for the least quality loss based on, for example, the least necessary transcoding steps to connected between a SO ISBC and a TO ISBC.

To this end, the voice call may be routed via the optimal SO ISBC to the one or more TO ISBCs that are capable to process the same audio codec or a high-level audio codec (e.g., the at least downgraded audio codec) as provided by the optimal SO IMS (e.g., establish a SIP interface that does not need a transcoding of the voice call).

Figure 6:
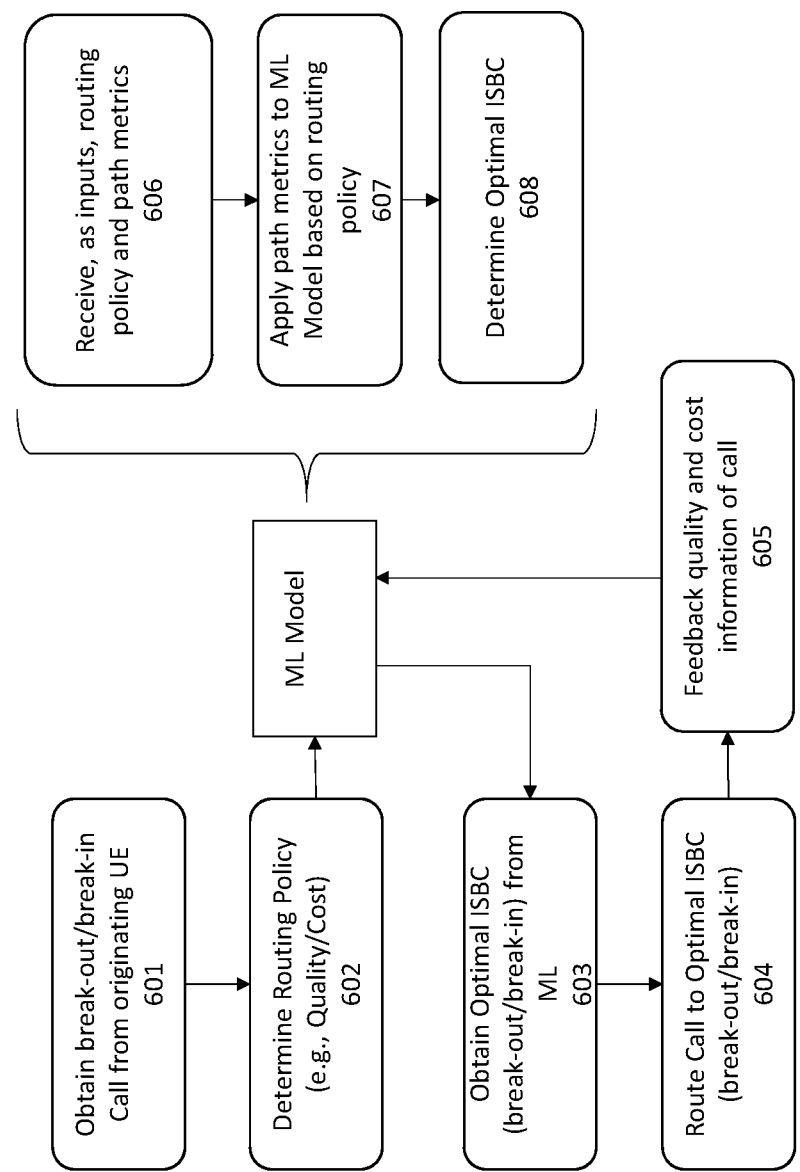
FIG. 6 illustrates a flowchart of a method for optimizing break-out/break-in paths of voice calls between an originating UE of a SO IMS and a terminating UE of a TO IMS according to an embodiment.

FIG. 6 illustrates a flowchart of a method for optimizing break-out/break-in paths of voice calls between an originating UE of a SO IMS and a terminating UE of a TO IMS, according to an embodiment. The method of FIG. 6 (or at least steps 601 through 604) may be performed by the SO ISBC. Alternatively, the method of FIG. 6 (or at least steps 601 through 604) may be performed by an external entity connected to the SO ISBC to update the optimal path from among a plurality of possible paths based on the relevant route parameters (e.g., cost or quality ranking) of the at least one path metric. Referring to FIG. 6, in step 601, the system for optimizing break-out/break-in paths of voice calls between the SO IMS and the TO IMS obtains a voice call from the originating UE in the SO IMS. In an example embodiment, the voice call originating from the UE may be a VoLTE call or a voice call originating from an OTT application hosted on the originating UE. Depending on the origin of the voice call (e.g., VoLTE or OTT call) the voice call may be coded with different audio codecs. For example, with an AMR-WB or an EVG audio codec for a VoLTE or an OPUS or AMR-WB for an OTT application, respectively.

In step 602, the system determines at least one routing policy for the voice call. For example, the routing policy may be one of a quality centric routing policy, a cost centric routing policy, or one or more combined quality and cost routing policies. The routing policy may be predetermined or pre-set by the SO, and/or may differ based on a type of the call (e.g., VoLTE vs. OTT), a type of the user (e.g., subscription level, etc.), etc. The routing policy is input to an ML model for determining an optimal call path (e.g., for determining an optimal TO ISBC) from among a plurality of possible paths.

At least one path metric (i.e., metric for optimal call path determination) may also be input to the ML model and applied according to the routing policy. The at least one path metric may include, for example, a Time of Day, an Average Minutes of Usage (MOU) (e.g., historical average between the two Mobile Subscriber Integrated Services Digital Network Number (MSISDN) of the call), a Call Setup Success Rate, a Call Setup Time, a Total Call Cost, a Voice Mean Opinion Score (MOS) (e.g., target Voice MOS of operator), an interconnect type (IP/TDM), a latency (e.g., target latency of operator), a latency threshold of the interface between the SO ISBC and a respective TO ISBC of at least one TO (i.e., TO1 ISBC, . . . . TON ISBC)), a call history of calls based on an MSISDN identification, etc. By way of example, for a particular TO, call costs and/or call qualities of the plurality of paths may vary based on the time of the day or the minutes of usage. The at least one path metric input may be applied to the ML model according to the routing policy. For example, where the routing policy is a cost-centric policy, then cost parameters relating to at least one of the Time of Day, Average MOU, and Total Call Cost (e.g., least cost routing dependent on a number hops) metrics may be considered by (or input to) the ML model. Similarly, where the routing policy is a quality-centric policy, then quality parameters relating to at least one of the Time of Day, Average MOU, Call Setup Success Rate (e.g., a target call setup success rate set by the operator), Call Setup Time, Voice MOS, interconnect type, and latency metrics may be considered by (or input to) the ML model.

In step 603, the system obtains an optimal TO ISBC as an output of the ML model. The optimal TO ISBC is determined by applying the at least one path metric according to the routing policy to the ML model, which dynamically determines (or predicts) the optimal path from among a plurality of possible paths based on the relevant route parameters (e.g., cost or quality ranking) of the at least one path metric. The determination by the ML model is described in further detail below with reference to steps 606-608.

In step 604, the system routes the call to the optimal TO ISBC obtained from the ML model.

In step 605, results (e.g., cost and quality information) of the call may be obtained and fed back to the ML model to tune the model (or one or more algorithms, ranking information (e.g., cost ranking per metric, quality ranking per metric, etc.), etc., thereof). According to an example embodiment, the ML model may be or include a reinforcement learning model in which a configuration thereof is dynamically updated by feedback information. In this case, the ML model may use the results of the call to update the model (e.g., ranking information) discussed in further detail below. For example, if the call results indicate that a particular input path metric was not satisfied by the call over the selected path/TO ISBC (e.g., latency for call is above a threshold latency or target latency indicated by input path metric), then a quality ranking corresponding to the latency path metric for the selected path may be updated such that the selected TO ISBC is given a lower rank by the ML model.

Steps 606-608 describe the operations of the ML model to determine the optimal path for the call. In step 606, the ML model receives, as inputs, the routing policy and at least one path metric according to the routing policy. For example, the ML model may receive the current time of day, an average MOU for the two users (e.g., MSISDNs for the originating and terminating UEs), and a total call cost (e.g., a target call cost value) as the path metrics where the routing policy is cost-centric (or cost-based). The ML model may also receive information on the SO and TO to apply the appropriate data/parameters.

In step 607, the at least one path metric is applied to or by the ML model according to the routing policy. The ML model may utilize, for each of the at least one path metric, one or more routing parameter rankings of the plurality of possible paths to determine the optimal path. The routing parameter rankings may be relative rankings of the plurality of possible paths with respect to the routing parameter. For example, the routing parameter rankings may include quality rankings, cost rankings, etc. For a given metric, none, one, some, or all of the routing parameter rankings (e.g., cost rankings and quality rankings) are used according to the routing policy. For example, if the routing policy is quality-centric, then cost rankings for the time of day may not be used or considered by the ML model. Conversely, if the routing policy is cost-centric, then quality rankings for the time of day metric may not be used or considered by the ML model. If the routing policy is a combined quality and cost policy, then both cost rankings and quality rankings may be used or considered by the ML model (e.g., via a weighted average, with the weights reflecting the routing policy). By way of example, if an input path metric is a latency of a particular value (e.g., target value set by operator), then a quality ranking of the possible paths would rank the paths in terms of ability to achieve that latency. If an input path metric is a current time of day, then a cost ranking of the possible paths would rank the paths in terms of their relative costs at that time.

At step 608, the ML model determines the optimal TO ISBC (i.e., optimal path) according to the applied path metrics. For example, the ML model determines the optimal TO ISBC (i.e., the optimal pairing of a SO ISBC and a TO ISBC) based on a weighted average of quality rank and/or cost rank of the one or more routing parameter rankings. For example, for each pairing of a SO ISBC and a TO ISBC, the ML model, based on the cost-centric policy and/or quality-centric policy, uses a weighted average of cost rankings and/or quality rankings for each of the at least one path metric to determine a TO ISBC with a highest weighted average. According to an embodiment, the weighted averages and/or rankings thereof for each of the pairings of SO ISBC and TO ISBC and for each of the routing policies may be pre-stored (e.g., in the ML model), such that the optimal path may be immediately determined upon receipt of a network-to-network voice call without delay for the weighted average calculation.

According to an embodiment, the ML model may output a cumulative rank (e.g., quality rank and/or cost rank) and determines the highest-ranked breakout path (i.e., the route with the highest cumulative rank among the plurality of routes 1, . . . , N) based on the determined routing policy (i.e., cost/quality centric routing policy).

As a result, based on the highest-ranked breakout path, the voice call is routed via the optimal ISBC. The system thereby enhances the user experience in the SO IMS (i.e., optimizing call quality) and optimizes costs for network-to-network calls. Moreover, in an example embodiment, cumulative rank (e.g., quality rank and/or cost rank) according to a dynamic route configuration may be considered to determine the highest-ranked breakout path.

FIG. 7 illustrates path metrics input to the ML model according to an example embodiment. As shown in FIG. 7, the path metrics may include Time of Day, Average MOU, Call Setup Success Rate, Call Setup Time, Total Call Cost, Voice MOS, etc. The ML model may consider or use quality rankings and/or cost rankings of a plurality of possible paths or routes (1 . . . n) for each of the path metrics.

Figure 8:
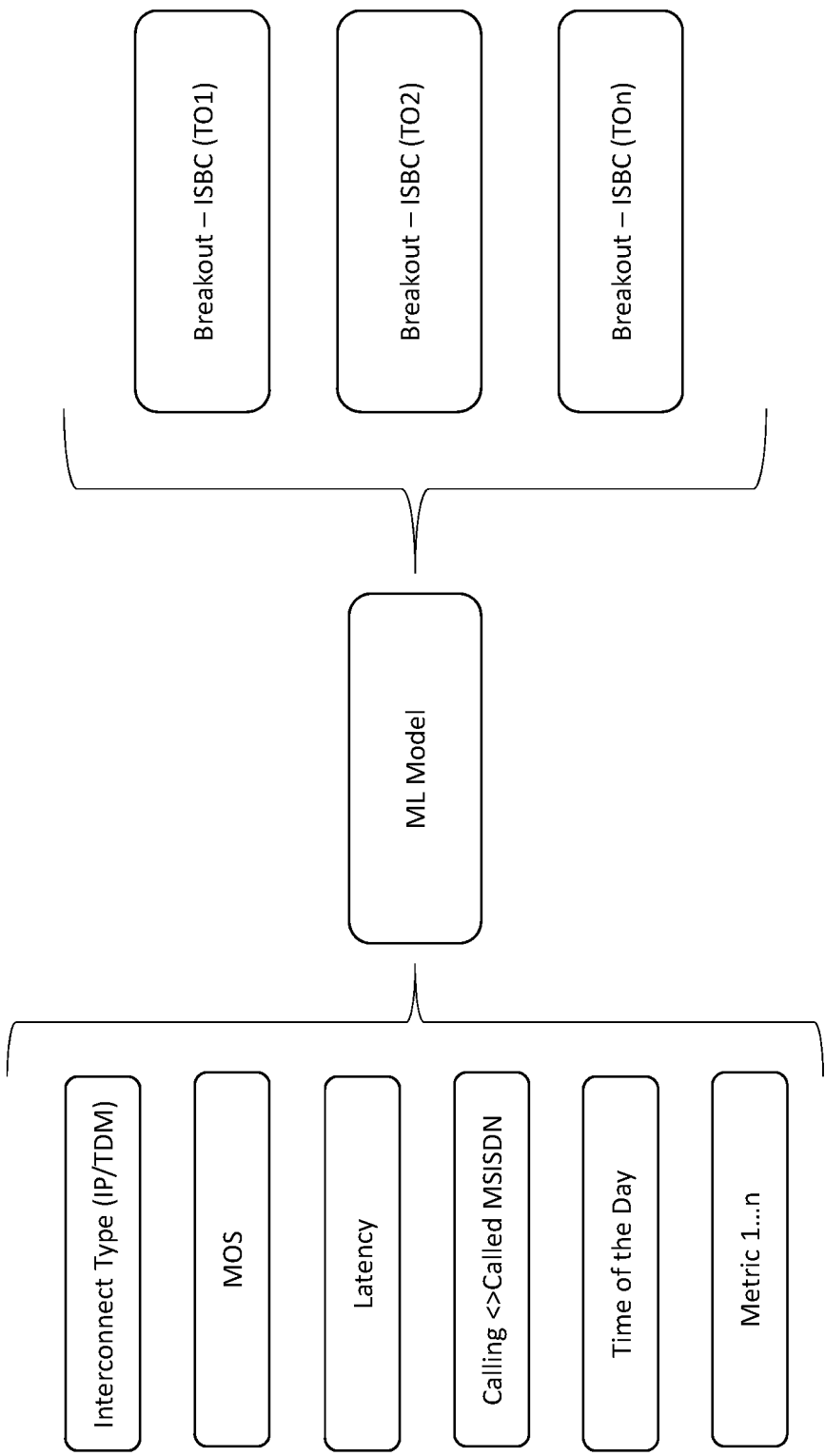
FIG. 8 illustrates inputs and outputs of an ML model for determining an optimal ISBC according to an example embodiment.

FIG. 8 illustrates inputs and outputs of an ML model for determining an optimal ISBC according to an example embodiment. Referring to FIG. 8, the ML model may receive a plurality of path metrics (Interconnect Type, MOS, Latency, MSISDNs, Time of Day, etc.) and apply the metrics according to a routing policy to determine an optimal ISBC for a voice call.

Figure 1:
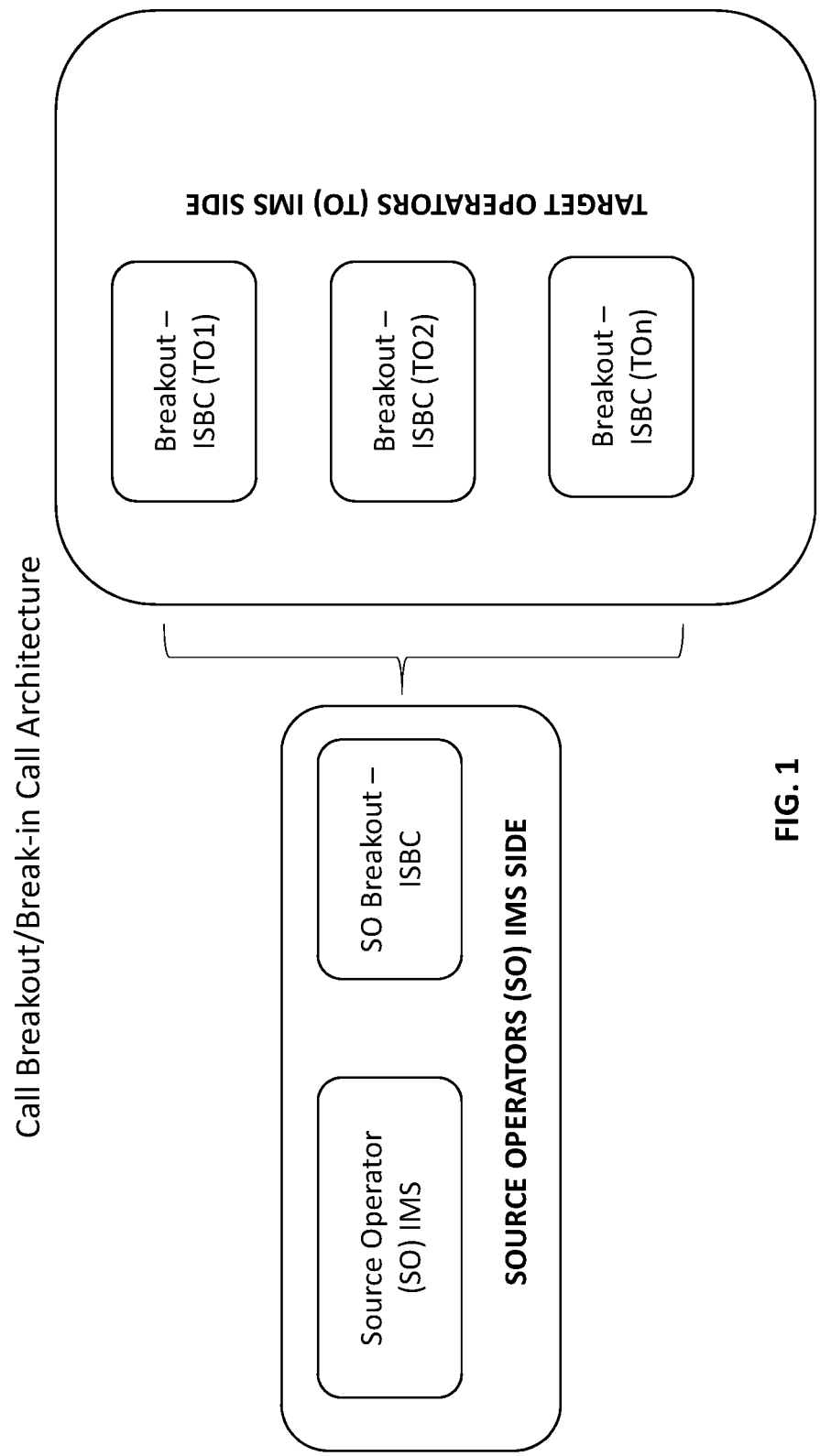
FIG. 1 illustrates a call break out/in architecture between a source operator (SO) IMS and a target operator (TO) IMS according to the related art.
Figure 9:
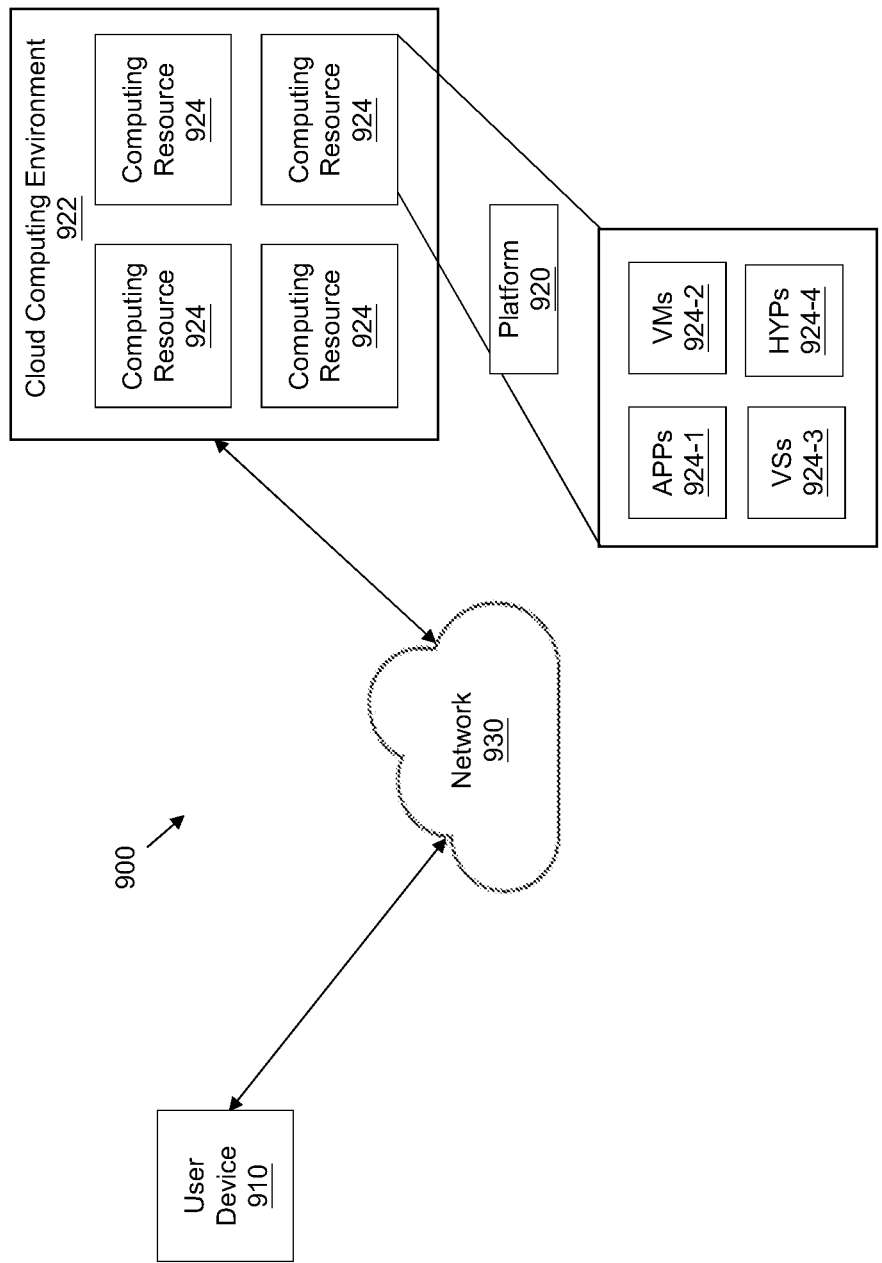
FIG. 9 is a diagram of an example environment in which systems and/or methods, described herein, may be implemented.

FIG. 9 is a diagram of an example environment 200 in which systems and/or methods, described herein, may be implemented. As shown in FIG. 9, environment 200 may include a user device 910, a platform 920, and a network 930. Devices of environment 200 may interconnect via wired connections, wireless connections, or a combination of wired and wireless connections. In embodiments, any of the functions and operations described with reference to FIG. 1 above may be performed by any combination of elements illustrated in FIG. 9.

User device 910 includes one or more devices capable of receiving, generating, storing, processing, and/or providing information associated with platform 920. For example, user device 910 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 910 may receive information from and/or transmit information to platform 920.

Platform 920 includes one or more devices capable of receiving, generating, storing, processing, and/or providing information. In some implementations, platform 920 may include a cloud server or a group of cloud servers. In some implementations, platform 920 may be designed to be modular such that certain software components may be swapped in or out depending on a particular need. As such, platform 920 may be easily and/or quickly reconfigured for different uses.

In some implementations, as shown, platform 920 may be hosted in cloud computing environment 922. Notably, while implementations described herein describe platform 920 as being hosted in cloud computing environment 922, in some implementations, platform 920 may not be cloud-based (i.e., may be implemented outside of a cloud computing environment) or may be partially cloud-based.

Cloud computing environment 922 includes an environment that hosts platform 920. Cloud computing environment 922 may provide computation, software, data access, storage, etc., services that do not require end-user (e.g., user device 910) knowledge of a physical location and configuration of system(s) and/or device(s) that hosts platform 920. As shown, cloud computing environment 922 may include a group of computing resources 924 (referred to collectively as "computing resources 924" and individually as "computing resource 924").

Computing resource 924 includes one or more personal computers, a cluster of computing devices, workstation computers, server devices, or other types of computation and/or communication devices. In some implementations, computing resource 924 may host platform 920. The cloud resources may include compute instances executing in computing resource 924, storage devices provided in computing resource 924, data transfer devices provided by computing resource 924, etc. In some implementations, computing resource 924 may communicate with other computing resources 924 via wired connections, wireless connections, or a combination of wired and wireless connections.

As further shown in FIG. 9, computing resource 924 includes a group of cloud resources, such as one or more applications ("APPs") 924-1, one or more virtual machines ("VMs") 924-2, virtualized storage ("VSs") 924-3, one or more hypervisors ("HYPs") 924-4, or the like.

Application 924-1 includes one or more software applications that may be provided to or accessed by user device 910. Application 924-1 may eliminate a need to install and execute the software applications on user device 910. For example, application 924-1 may include software associated with platform 920 and/or any other software capable of being provided via cloud computing environment 922. In some implementations, one application 924-1 may send/receive information to/from one or more other applications 924-1, via virtual machine 924-2.

Virtual machine 924-2 includes a software implementation of a machine (e.g., a computer) that executes programs like a physical machine. Virtual machine 924-2 may be either a system virtual machine or a process virtual machine, depending upon use and degree of correspondence to any real machine by virtual machine 924-2. A system virtual machine may provide a complete system platform that supports execution of a complete operating system ("OS"). A process virtual machine may execute a single program, and may support a single process. In some implementations, virtual machine 924-2 may execute on behalf of a user (e.g., user device 910), and may manage infrastructure of cloud computing environment 922, such as data management, synchronization, or long-duration data transfers.

Virtualized storage 924-3 includes one or more storage systems and/or one or more devices that use virtualization techniques within the storage systems or devices of computing resource 924. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 924-4 may provide hardware virtualization techniques that allow multiple operating systems (e.g., "guest operating systems") to execute concurrently on a host computer, such as computing resource 924. Hypervisor 924-4 may present a virtual operating platform to the guest operating systems, and may manage the execution of the guest operating systems. Multiple instances of a variety of operating systems may share virtualized hardware resources.

Network 930 includes one or more wired and/or wireless networks. For example, network 930 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 9 are provided as an example. In practice, there may be additional devices and/or networks, fewer devices and/or networks, different devices and/or networks, or differently arranged devices and/or networks than those shown in FIG. 9. Furthermore, two or more devices shown in FIG. 9 may be implemented within a single device, or a single device shown in FIG. 9 may be implemented as multiple, distributed devices. Additionally, or alternatively, a set of devices (e.g., one or more devices) of environment 200 may perform one or more functions described as being performed by another set of devices of environment 200.

Figure 10:
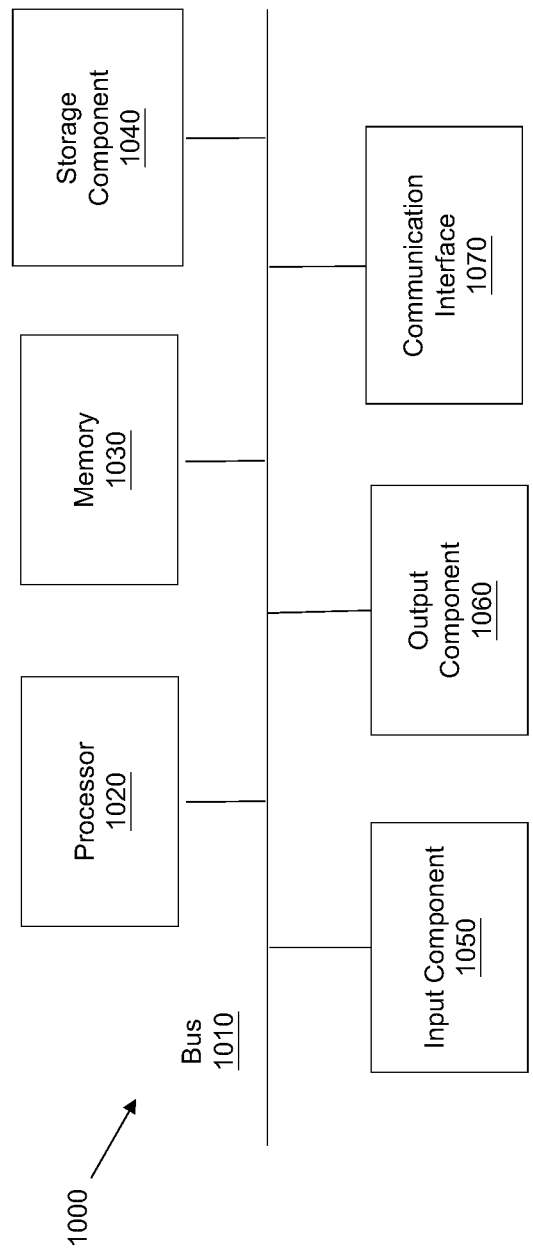
FIG. 10 is a diagram of example components of a device according to an embodiment.

FIG. 10 is a diagram of example components of a device 1000. Device 1000 may correspond to user device 910 and/or platform 920. As shown in FIG. 10, device 1000 may include a bus 1010, a processor 1020, a memory 1030, a storage component 1040, an input component 1050, an output component 1060, and a communication interface 1070.

Bus 1010 includes a component that permits communication among the components of device 1000. Processor 1020 may be implemented in hardware, firmware, or a combination of hardware and software. Processor 1020 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1020 includes one or more processors capable of being programmed to perform a function. Memory 1030 includes a random access memory (RAM), a read only memory (ROM), and/or another type of dynamic or static storage device (e.g., a flash memory, a magnetic memory, and/or an optical memory) that stores information and/or instructions for use by processor 1020.

Storage component 1040 stores information and/or software related to the operation and use of device 1000. For example, storage component 1040 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 1050 includes a component that permits device 1000 to receive information, such as via user input (e.g., a touch screen display, a keyboard, a keypad, a mouse, a button, a switch, and/or a microphone). Additionally, or alternatively, input component 1050 may include a sensor for sensing information (e.g., a global positioning system (GPS) component, an accelerometer, a gyroscope, and/or an actuator). Output component 1060 includes a component that provides output information from device 1000 (e.g., a display, a speaker, and/or one or more light-emitting diodes (LEDs)).

Communication interface 1070 includes a transceiver-like component (e.g., a transceiver and/or a separate receiver and transmitter) that enables device 1000 to communicate with other devices, such as via a wired connection, a wireless connection, or a combination of wired and wireless connections. Communication interface 1070 may permit device 1000 to receive information from another device and/or provide information to another device. For example, communication interface 1070 may include an Ethernet interface, an optical interface, a coaxial interface, an infrared interface, a radio frequency (RF) interface, a universal serial bus (USB) interface, a Wi-Fi interface, a cellular network interface, or the like.

Device 1000 may perform one or more processes described herein. Device 1000 may perform these processes in response to processor 1020 executing software instructions stored by a non-transitory computer-readable medium, such as memory 1030 and/or storage component 1040. A computer-readable medium is defined herein as a non-transitory memory device. A memory device includes memory space within a single physical storage device or memory space spread across multiple physical storage devices.

Software instructions may be read into memory 1030 and/or storage component 1040 from another computer-readable medium or from another device via communication interface 1070. When executed, software instructions stored in memory 1030 and/or storage component 1040 may cause processor 1020 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 10 are provided as an example. In practice, device 1000 may include additional components, fewer components, different components, or differently arranged components than those shown in FIG. 10. Additionally, or alternatively, a set of components (e.g., one or more components) of device 1000 may perform one or more functions described as being performed by another set of components of device 1000.

In embodiments, any one of the operations or processes of FIGS. 1 to 8 may be implemented by or using any one of the elements illustrated in FIGS. 9 and 10. It is understood that other embodiments are not limited thereto, and may be implemented in a variety of different architectures (e.g., bare metal architecture, any cloud-based architecture or deployment architecture such as Kubernetes, Docker, OpenStack, etc.).

According to embodiments, a system for optimizing break-out/break-in paths of voice calls between a source operator's (SO) IP Multimedia Core Network Subsystems (IMS) and a target operator's IMS (TO IMS) includes: at least one memory storing instructions; and at least one processor configured to execute the instructions to: obtain a voice call originating from a user equipment (UE) in the SO IMS and terminating at an UE in the TO IMS; determine a routing policy for the voice call; determine an optimal TO Interconnect Session Border Controller (ISBC) by applying at least one path metric according to the routing policy to a machine learning (ML) model for determining an optimal route between the SO IMS and the TO IMS; and route the voice call to the optimal TO ISBC, wherein the ML model determines the optimal TO ISBC by using, for each of the at least one path metric, one or more routing parameter rankings of a plurality of possible paths between the SO IMS and the TO IMS.

The one or more routing parameter rankings may include quality rankings and cost rankings.

The at least one processor may be further configured to execute the instructions to provide, to the ML model, feedback on the voice call routed to the optimal TO ISBC; wherein the ML model is a reinforcement learning model configured to update the one or more routing parameter rankings of the plurality of possible paths between the SO IMS and the TO IMS based on the feedback; and the feedback comprises at least one of cost and quality information of the voice call.

The routing policy may be determined from among a plurality of routing policies, the plurality of routing policies comprising at least one of a cost-centric routing policy, a quality-centric routing policy, and one or more combined cost and quality routing policies.

The at least one path metric may include at least one of a Time of Day, an Average Minutes of Usage (MOU), a Call Setup Success Rate, a Call Setup Time, a Total Call Cost, and a Voice Mean Opinion Score (MOS).

The ML model may predict the optimal TO ISBC based on a combination of a call cost and/or a call quality for the plurality of possible paths.

According to embodiments, a method for optimizing break-out/break-in paths of voice calls between a source operator's (SO) IP Multimedia Core Network Subsystems (IMS) and a target operator's network (TO IMS) includes: obtaining a voice call originating from a user equipment (UE) in the SO IMS and terminating at an UE in the TO IMS; determining a routing policy for the voice call; determining an optimal TO Interconnect Session Border Controller (ISBC) by applying at least one path metric according to the routing policy to a machine learning (ML) model for determining an optimal route between the SO IMS and the TO IMS; and route the voice call to the optimal TO ISBC, wherein, the ML model, for determining the optimal TO ISBC using, for each of the at least one path metric, one or more routing parameter rankings of a plurality of possible paths between the SO IMS and the TO IMS.

The one or more routing parameter rankings may include quality rankings and cost rankings.

The method may further include: providing, to the ML model, feedback on the voice call routed to the optimal TO ISBC; wherein the ML model is a reinforcement learning model configured to update the one or more routing parameter rankings of the plurality of possible paths between the SO IMS and the TO IMS based on the feedback; and the feedback comprises at least one of cost and quality information of the voice call.

The routing policy may be determined from among a plurality of routing policies, the plurality of routing policies comprising at least one of a cost-centric routing policy, a quality-centric routing policy, and one or more combined cost and quality routing policies.

The at least one path metric may include at least one of a Time of Day, an Average Minutes of Usage (MOU), a Call Setup Success Rate, a Call Setup Time, a Total Call Cost, and a Voice Mean Opinion Score (MOS).

The ML model may predicts the optimal TO ISBC based on a combination of a call cost and/or a call quality for the plurality of possible paths.

According to embodiments, a non-transitory computer-readable recording medium having recorded thereon instructions executable by at least one processor configured to perform a method for optimizing break-out/break-in paths of voice calls between a source operator's (SO) IP Multimedia Core Network Subsystems (IMS) and a target operator's network (TO IMS) includes: obtaining a voice call originating from a user equipment (UE) in the SO IMS and terminating at an UE in the TO IMS; determining a routing policy for the voice call; determining an optimal TO Interconnect Session Border Controller (ISBC) by applying at least one path metric according to the routing policy to a machine learning (ML) model for determining an optimal route between the SO IMS and the TO IMS; and route the voice call to the optimal TO ISBC, wherein, the ML model, for determining the optimal TO ISBC using, for each of the at least one path metric, one or more routing parameter rankings of a plurality of possible paths between the SO IMS and the TO IMS.

The one or more routing parameter rankings may include quality rankings and cost rankings.

The method may further include: providing, to the ML model, feedback on the voice call routed to the optimal TO ISBC; wherein the ML model is a reinforcement learning model configured to update the one or more routing parameter rankings of the plurality of possible paths between the SO IMS and the TO IMS based on the feedback; and the feedback comprises at least one of cost and quality information of the voice call.

The routing policy may be determined from among a plurality of routing policies, the plurality of routing policies comprising at least one of a cost-centric routing policy, a quality-centric routing policy, and one or more combined cost and quality routing policies.

The at least one path metric may include at least one of a Time of Day, an Average Minutes of Usage (MOU), a Call Setup Success Rate, a Call Setup Time, a Total Call Cost, and a Voice Mean Opinion Score (MOS).

The ML model may predicts the optimal TO ISBC based on a combination of a call cost and/or a call quality for the plurality of possible paths.

According to example embodiments, the systems and methods enhancing user experience and optimizing costs for network-to-network calls.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

What is claimed is:

1. A system for optimizing break-out/break-in paths of voice calls between a source operator's (SO) IP Multimedia Core Network Subsystems (IMS) and a target operator's IMS (TO IMS), the system comprising:
    at least one memory storing instructions; and
    at least one processor configured to execute the instructions to:
        obtain a voice call originating from a user equipment (UE) in the SO IMS and terminating at an UE in the TO IMS;
        determine a routing policy for the voice call;
        determine an optimal TO Interconnect Session Border Controller (ISBC) by applying at least one path metric according to the routing policy to a machine learning (ML) model for determining an optimal route between the SO IMS and the TO IMS;
        route the voice call to the optimal TO ISBC, and
        provide, to the ML model, feedback on the voice call routed to the optimal TO ISBC,
        wherein the ML model determines the optimal TO ISBC by using, for each of the at least one path metric, one or more routing parameter rankings of a plurality of possible paths between the SO IMS and the TO IMS, and
        wherein the ML model is configured to update the one or more routing parameter rankings of the plurality of possible paths between the SO IMS and the TO IMS based on the feedback.

2. The system as claimed in claim 1, wherein the one or more routing parameter rankings comprise quality rankings and cost rankings.

3. The system as claimed in claim 1,
    wherein the ML model is a reinforcement learning model; and
    wherein the feedback comprises at least one of cost and quality information of the voice call.

4. The system as claimed in claim 1, wherein the routing policy is determined from among a plurality of routing policies, the plurality of routing policies comprising at least one of a cost-centric routing policy, a quality-centric routing policy, and one or more combined cost and quality routing policies.

5. The system as claimed in claim 1, wherein the at least one path metric comprises at least one of a Time of Day, an Average Minutes of Usage (MOU), a Call Setup Success Rate, a Call Setup Time, a Total Call Cost, and a Voice Mean Opinion Score (MOS).

6. The system as claimed in claim 1, wherein the ML model predicts the optimal TO ISBC based on a combination of a call cost and a call quality for the plurality of possible paths.

7. A method for optimizing break-out/break-in paths of voice calls between a source operator's (SO) IP Multimedia Core Network Subsystems (IMS) and a target operator's network (TO IMS), the method comprising:
    obtaining a voice call originating from a user equipment (UE) in the SO IMS and terminating at an UE in the TO IMS;
    determining a routing policy for the voice call;
    determining an optimal TO Interconnect Session Border Controller (ISBC) by applying at least one path metric according to the routing policy to a machine learning (ML) model for determining an optimal route between the SO IMS and the TO IMS;
    providing, to the ML model, feedback on the voice call routed to the optimal TO ISBC;
    routing the voice call to the optimal TO ISBC,
    wherein, the ML model, for determining the optimal TO ISBC using, for each of the at least one path metric, one or more routing parameter rankings of a plurality of possible paths between the SO IMS and the TO IMS, and
    wherein the ML model is configured to update the one or more routing parameter rankings of the plurality of possible paths between the SO IMS and the TO IMS based on the feedback.

8. The method as claimed in claim 7, wherein, wherein the one or more routing parameter rankings comprise quality rankings and cost rankings.

9. The method as claimed in claim 7,
    wherein the ML model is a reinforcement learning model, and wherein the feedback comprises at least one of cost and quality information of the voice call.

10. The method as claimed in claim 7, wherein the routing policy is determined from among a plurality of routing policies, the plurality of routing policies comprising at least one of a cost-centric routing policy, a quality-centric routing policy, and one or more combined cost and quality routing policies.

11. The method as claimed in claim 7, wherein the at least one path metric comprises at least one of a Time of Day, an Average Minutes of Usage (MOU), a Call Setup Success Rate, a Call Setup Time, a Total Call Cost, and a Voice Mean Opinion Score (MOS).

12. The method as claimed in claim 7, wherein the ML model predicts the optimal TO ISBC based on a combination of a call cost and a call quality for the plurality of possible paths.

13. A non-transitory computer-readable recording medium having recorded thereon instructions executable by at least one processor configured to perform a method for optimizing break-out/break-in paths of voice calls between a source operator's (SO) IP Multimedia Core Network Subsystems (IMS) and a target operator's network (TO IMS), the method comprising:
  obtaining a voice call originating from a user equipment (UE) in the SO IMS and terminating at an UE in the TO IMS;
  determining a routing policy for the voice call;
  determining an optimal TO Interconnect Session Border Controller (ISBC) by applying at least one path metric according to the routing policy to a machine learning (ML) model for determining an optimal route between the SO IMS and the TO IMS;
  providing, to the ML model, feedback on the voice call routed to the optimal TO ISBC
  routing the voice call to the optimal TO ISBC,
  wherein, the ML model, for determining the optimal TO ISBC using, for each of the at least one path metric, one or more routing parameter rankings of a plurality of possible paths between the SO IMS and the TO IMS, and
  wherein the ML model is configured to update the one or more routing parameter rankings of the plurality of possible paths between the SO IMS and the TO IMS based on the feedback.

14. The non-transitory computer-readable recording medium as claimed in claim 13, wherein the one or more routing parameter rankings comprise quality rankings and cost rankings.

15. The non-transitory computer-readable recording medium as claimed in claim 13,
  wherein the ML model is a reinforcement learning model, and
  wherein the feedback comprises at least one of cost and quality information of the voice call.

16. The non-transitory computer-readable recording medium as claimed in claim 13,
  wherein the routing policy is determined from among a plurality of routing policies, the plurality of routing policies comprising at least one of a cost-centric routing policy, a quality-centric routing policy, and one or more combined cost and quality routing policies.

17. The non-transitory computer-readable recording medium as claimed in claim 13, wherein the at least one path metric comprises at least one of a Time of Day, an Average Minutes of Usage (MOU), a Call Setup Success Rate, a Call Setup Time, a Total Call Cost, and a Voice Mean Opinion Score (MOS).

18. The non-transitory computer-readable recording medium as claimed in claim 13, wherein the ML model predicts the optimal TO ISBC based on a combination of a call cost and a call quality for the plurality of possible paths.

* * * * *